United States Patent [19]

Kurematsu et al.

[11] Patent Number: 5,439,560
[45] Date of Patent: Aug. 8, 1995

[54] LOW PRESSURE EVAPORATION CONCENTRATING APPARATUS FOR A PHOTOGRAPHIC PROCESS WASTE DISPOSL

[75] Inventors: Masayuki Kurematsu; Nobutaka Goto, both of Hino, Japan

[73] Assignees: Konica Corporation; Sanyo Electric Co., Ltd., Japan

[21] Appl. No.: 312,442

[22] Filed: Sep. 26, 1994

Related U.S. Application Data

[63] Continuation of Ser. No. 855,112, Mar. 17, 1992, abandoned, which is a continuation of Ser. No. 658,202, Feb. 20, 1991, abandoned.

[30] Foreign Application Priority Data

Feb. 22, 1990 [JP] Japan .................................. 2-41616
Apr. 9, 1990 [JP] Japan .................................. 2-93578

[51] Int. Cl.$^6$ .............................................. B01D 3/10
[52] U.S. Cl. .................................. 202/186; 62/238.5;
62/238.7; 159/47.3; 159/901; 159/DIG. 16;
159/DIG. 40; 202/205; 203/87; 203/91;
203/DIG. 4; 203/DIG. 14
[58] Field of Search ............... 202/186, 182, 205, 202,
202/235; 203/91, 100, 87, DIG. 4, DIG. 14;
159/47.3, 901, DIG. 16, DIG. 40; 354/324;
62/238.5, 238.7, 324.2

[56] References Cited

U.S. PATENT DOCUMENTS

| | | | |
|---|---|---|---|
| 3,449,220 | 6/1969 | Geisler et al. | 203/DIG. 14 |
| 3,733,994 | 5/1973 | Armstrong et al. | 354/324 |
| 3,891,495 | 6/1975 | Baird | 159/49 |
| 3,915,712 | 10/1975 | Herzhoff et al. | 159/13.2 |
| 3,935,899 | 2/1976 | Jolly | 165/50 |
| 3,995,298 | 11/1976 | Vandeputte et al. | 354/324 |
| 4,003,798 | 1/1977 | McCord | 203/DIG. 4 |
| 4,043,907 | 8/1977 | Shimamura et al. | 430/430 |
| 4,135,803 | 1/1979 | Van Houwelingen | 354/299 |
| 4,214,454 | 7/1980 | Taylor | 203/DIG. 4 |
| 4,267,022 | 5/1981 | Pitcher | 203/DIG. 4 |
| 4,278,502 | 7/1981 | Stevens et al. | 203/DIG. 4 |
| 4,313,311 | 2/1982 | McCord | 203/DIG. 4 |
| 4,506,520 | 3/1985 | McCord | 203/DIG. 4 |
| 4,735,728 | 4/1988 | Wemhoff | 159/47.3 |
| 4,828,717 | 5/1989 | De Leeucad et al. | 159/47.3 |
| 4,940,134 | 7/1990 | Aoki et al. | 159/47.3 |
| 4,961,859 | 10/1990 | Uehara et al. | 159/47.3 |
| 5,004,522 | 4/1991 | Koboshi et al. | 159/47.3 |

FOREIGN PATENT DOCUMENTS

| | | | |
|---|---|---|---|
| 0223605 | 5/1987 | European Pat. Off. | 159/47.3 |
| 1191619 | 5/1985 | Italy . | |
| 5992202 | 3/1984 | Japan | 159/47.3 |
| 70841 | 5/1985 | Japan | 159/47.3 |
| 2035813 | 6/1980 | United Kingdom | 203/DIG. 4 |

*Primary Examiner*—Virginia Manoharan
*Attorney, Agent, or Firm*—Jordan B. Bierman; Bierman and Muserlian

[57] ABSTRACT

An apparatus for concentrating a photographic processing solution in which there are provided an evaporation chamber, a heater for heating the solution to generate a vapor in the evaporation chamber, a condensation chamber communicated to the evaporation chamber for recieving the vapor, a cooling device for cooling the vapor to generate a condensation, and an ejector for reducing the pressure in the evaporation chamber and the condensation chamber. There is further provided a heat pump having a heat radiating portion used for the heater and a plurality of heat absorbing portions, one of which is used for the cooling device.

7 Claims, 5 Drawing Sheets

LOW PRESSURE EVAPORATION CONCENTRATING APPARATUS FOR A PHOTOGRAPHIC PROCESS WASTE DISPOSL

This application is a continuation of application Ser. No. 07/855,112, filed Mar. 17, 1992, now abandoned which is a continuation of Ser. No. 07/658,202, now abandoned.

BACKGROUND OF THE INVENTION

The present invention relates to a low pressure evaporation concentrating apparatus for photograph process waste disposal, and more particularly concerns a low pressure evaporation concentrating apparatus for photographic process waste disposal suitable for processing of photographic process waste liquid generated in the development process of photographic sensitizing materials by an automatic developing machine in it or in the vicinity of it without collecting dealers.

Also, the present invention relates to an improved method and system for increasing a concentrating speed and a thermal efficiency in evaporating and concentrating the photographic process waste liquid.

For monochrome sensitizing materials, in general, photographic process of halogenated photographic sensitizing materials is carried out by development, fixing, and water washing. For color sensitizing materials, it is carried out by combined steps using process solutions having one or two features of color development, bleaching fixing (or bleaching and fixing), water washing, and stabilization.

In addition, the photographic process for mass sensitizing materials has to have the components consumed in the process supplied. It has to remove components such as bromide ions in the developing solution and complex silver salt, dissolved in the process solution or concentrated by evaporation to keep the components constant and to maintain the performance of the process solution. For the purpose, the process solution has to be replenished, and parts of the process solution have to be discarded to remove the components concentrated in the photographic process.

Recent photographic developing systems have been improved so that the supply solutions, including the washing water, can be reduced considerably for environmental and economic reasons. The photographic process waste liquid, however, has been led from a process tank of the automatic developing machine through a waste liquid pipe, diluted with the waste washing water or cooling water for the automatic developing machine or the like, and discharged into sewers.

However, though the washing water and cooling water can be discarded to the sewers or rivers, with recent strengthened environmental pollution restriction rules, it is substantially impossible to discard the photographic process solutions such as the developing solution, fixing solution, color developing solution, bleaching fixing solution (or bleaching solution and fixing solution), and stabilizing solution.

For the reason, photographic process traders have to pay to have the waste liquid collected by special waste process dealers. Alternately, they install a pollution preventive facility.

However, the entrustment to the waste process dealers has a disadvantage that it needs considerable space to reserve the waste liquid. Also, the costs are very high. The pollution preventive facility also has a disadvantage that it is very expensive in initial cost. It needs very large space for its maintenance.

There have been many processes proposed for environmental pollution prevention to reduce the pollution extent of photographic process waste disposal. They include the activated sludge processes proposed in the Japanese Patent Examined Publication Nos. 12943-1976 and 7952-1976, the evaporation processes proposed in the Japanese Patent Publication Open to Public Inspection Nos. 89437-1974 and 56-33996, the electrolytic oxidation processes proposed in the Japanese Patent Publication Open to Public Inspection Nos. 84462-1973 and 119458-1973, the Japanese Patent Examined Publication No. 43478-1978, and Japanese Patent Publication Open to Public Inspection No. 119457-1974, the ion exchange processes proposed in the Japanese Patent Examined Publication 37704-1976, the Japanese Patent Publication Open to Public Inspection No. 383-1978, and the Japanese Patent Publication Open to Public Inspection No. 53-43271, the reverse osmotic processes proposed in the Japanese Patent Publication Open to Public Inspection No. 22463-1975, the chemical processes proposed in the Japanese Patent Publication Open to Public Inspection No. 64257-1974, the Japanese Patent Examined Publication No. 37396-1982, the Japanese Patent Publication Open to Public Inspection Nos. 12152-1978, 49-58833, 53-63763, and the Japanese Patent Examined Publication No. 37395-1982. These processes mentioned above are not sufficient for preventing environmental pollution.

On the ocher hand, there has been proposed a waterless automatic developing machine having no piping for feeding fresh water and draining waste water and having a stabilizing process in place of water washing. Recently, it is being popularly used in connection with restriction of water resource, increased water feed and drainage cost, simplified process, and operational easiness around it. For such a process, it is desired to omit the cooling water for controlling the temperature of the process solutions.

The photographic process having absolutely no washing water and cooling water has very high pollution potential as it is not diluted with water as compared with the one having the waste liquid drained from the automatic developing machine on the other hand, it is distinguished by a small amount of waste liquid. With little waste liquid, piping for feeding water and draining the waste liquid can be omitted outside the machine. The features solved the disadvantages of the conventional automatic developing machine that the piping is hard to move after installation, the operating space becomes too narrow, the installation cost is too high, and high energy cost for feeding warm water is needed. The improved machine therefore had a very high advantage that it could be made so compact and simple that it can be used as office machine.

However, on the other hand, the waste liquid has a very high pollution capability so that it cannot be discharged into sewers and rivers as well in view of recent environmental pollution restrictions. The quantity of waste liquid in such a photographic process is relatively small, but amounts to 10 liters a day in a small color process laboratory.

Thus, the waste liquid would be generally collected by the waste liquid collecting dealers, who make a second and third treating of it to avoid pollution. The price for collection of the waste liquid becomes higher year by year. The small laboratories cannot easily have the waste liquid collected as its collection efficiency is too low, resulting in abundance of the waste liquid in the shops.

In order to solve these problems, it has been proposed to heat the photographic process waste liquid to evaporate the moisture to dry or solidify it so that the photographic process waste disposal can be made in the mini laboratory shops. Such a method was disclosed, for example, in the Japanese Utility Model Application Laid-Open No. 70841-1985.

With investigation of the inventors, they found that if the photographic process waste liquid is evaporated, this generates harmful or very offensive gases, such as sulfurous acid gas, hydrogen sulfide, and ammonium gas. It was found that the gases were generated because the ammonium thiosulfate and sulfites, such as ammonium salts, sodium salts, or potassium salts, which are often used for the fixing solution and bleaching fixing solution, are decomposed at a high temperature. In the evaporation process, further, the moisture in the photographic process waste liquid is evaporated to vapor to expand its volume. This causes the pressure in the evaporation pot to increase. The increased pressure causes the harmful or offensive gases to leak out of the evaporation apparatus. This is very undesirable for operational environment.

In order to solve such problems as mentioned above, the Japanese Utility Model Application Laid-Open No. 70841-1985 has disclosed a method that an evaporation process apparatus has an exhausted gas process section having activated charcoal or the like provided at an exhausting pipe thereof.

However, this method has the serious disadvantage that the vapor of a large amount of moisture from the photographic process waste liquid becomes dew or condensed water at the exhaust gas process section, and the moisture covers the gas absorbing agent and thus instantaneously loses its gas absorbing capability. So, it cannot be used for practical application yet.

In order to overcome such difficulties as mentioned above, the inventors have previously proposed a photographic process waste liquid treating method and apparatus that when the photographic process waste liquid is evaporated, the apparatus has a cooling condensation unit provided to condense the vapor generated in evaporation, to properly treat the water condensed in cooling and to discharge, and to properly treat non-condensed components.

However, the inventors found the following problems in the proposal mentioned above. The vapor generated in the evaporation process can be usually condensed by the cooling condensation unit. If the cooling condensation efficiency is too low, however, a ratio of the vapor that is not condensed but discharged becomes high. Even if it is absorbed with the activated charcoal, a ratio of the harmful and offensive gases discharged also becomes high. The water condensed by the cooling condensation unit, also, causes pollution even if absorbed by the activated charcoal. As it is high in the pollution capability, it cannot be often discharged to sewers directly.

As a mini laboratory shop is limited in the space, the offensive smell generated through the photographic solution process becomes a serious problem. It is also a problem that the waste liquid process apparatus itself occupies the limited place. Its expensive price and high running cost further raise a serious problem.

Thus, it has been requested to have a novel waste liquid process apparatus that can process the photographic process waste liquid at a high concentrating speed without generating harmful and offensive gases, being of compact form, available at inexpensive price and capable of operating at a low running cost.

In order to solve such problems, the inventors have proposed methods such as described in Japanese Patent Publication O.P.I. No. 151301/1988 and the like that are available to reduce the offensive smell generated from the photographic process waste liquid, to condense the waste liquid in a relatively secure way, and to make its disposal easy. It uses a low-pressure method in which the gas pressure in a column is lowered to evaporate the waste liquid at a relatively low temperature, but the temperature of the exhaust vapor remains high. It therefore still has the disadvantage of components of offensive smell mixing in the exhaust vapor.

For this reason, the exhaust vapor also should be cooled to condense it. The offensive smell can be reduced together with the exhaust vapor so that the offensive odor can be further prevented. However, with both a heating unit and a cooling unit, the apparatus becomes large, and the installation cost becomes high.

In view of solving the problems mentioned above, it is the first object of the present invention to provide a low pressure evaporation concentrating apparatus for photographic process waste disposal without generation of offensive smell which is achieved in a compact form at low cost and has high efficiency.

As described previously, the photographic process waste liquid has to be evaporated and concentrated in an on-demand way in a vicinity of the automatic developing machine. It is however not a good method to use a conventional electric heater for evaporation as it consumes high power. In order to solve this, the inventors used a heat pump that has been proposed in the Japanese Patent Publication Open to Public Inspection No. 151301-1988. The heat pump was provided for a heating section to evaporate and to a cooling section to cool the generated vapor and gases. It was successfully achieved to reduce the consumed power to lower than 50%.

However, a photographic laboratory does not only consume a large amount of power for evaporating and concentrating the photographic process waste liquid, but also consumes a great amount of power for temperature controlling of the process solutions in the automatic developing machine and for heating or cooling in a drying section.

By all accounts, it is further requested to reduce the heating and cooling powers. In particular, if power higher than 30 A is needed, it also costs for wiring the power line.

In view of the foregoing, it is the second object of the present invention to provide a low pressure evaporation concentrating method and apparatus for photographic process waste disposal that can further increase the heat efficiency and improve the treat capability.

SUMMARY OF THE INVENTION

The first object of the present invention mentioned above can be achieved by a low pressure evaporation concentrating apparatus comprising an evaporation concentrating column which has the photographic process waste liquid put therein and heated to evaporate, a vapor condensing section which is communicated to the column to cool the vapor fed from the column, a heat pump having sections for the heating and cooling, and a pressure reducing section for reducing the pressures in the evaporation concentrating column and the vapor condensing section communicated thereto, wherein the cooling section of the heat pump is divided into two or more subsections, at least one subsection being used for cooling the vapor generated from the evaporation concentrating column.

The second object of the present invention mentioned above can be achieved by the following constructions.

(a) An evaporation concentrating method and method for photograph process waste disposal in which the photographic process waste liquid is heated to evaporated and concentrated with use of the heat pump, and the vapor generated thereby is cooled and condensed to liquefy, wherein pH of the photographic process waste liquid containing fixing components is adjusted to 4.5 to 7.5 to feed.

(b) The evaporation and cooling the vapor in the method in paragraph (a) above are made at a low pressure.

(c) For an adjusting agent of the pH is used a development waste liquid.

(d) An evaporation concentrating apparatus for photographic process waste disposal comprising an evaporation concentrating column which can evaporate photographic process waste liquid with use of a heating section of a heat pump, a condensing section communicated thereto for condensing vapor with use of a cooling section of the heat pump, a section for feeding the photographic process waste liquid into the column, and a section for supplying a pH adjusting agent thereinto.

(e) In the evaporation concentrating apparatus for photographic process waste disposal mentioned in paragraph (d) above, a pressure reducing section is provided for reducing pressure in the evaporation concentrating column and the condensing section communicated thereto.

As described above, the inventors found that the evaporation concentration rate could be improved in the way that the pH range of the photographic process waste liquid is limited at the time of evaporating concentration.

In the Japanese Patent Publication Open to Public Inspection No. 143991-1988 in connection to that, the inventors kept the pH of the photographic process waste liquid to 3 to 11 at the time of evaporating concentration. This successfully could prevent decomposition of thiosulfate in the waste liquid so that generation of offensive smell could be minimized. The present invention is based on the inventors' experimental results that as it has been further studied and developed, the evaporating concentration rate could be greatly improved with the pH limited to 4.5 to 7.5.

BRIEF DESCRIPTION OF THE DRAWINGS

Other objects and advantages of the present invention will further become apparent thereinafter and in the drawings in which.

DETAILED DESCRIPTION OF THE PREFERRED EMBODIMENT

Figure 1:
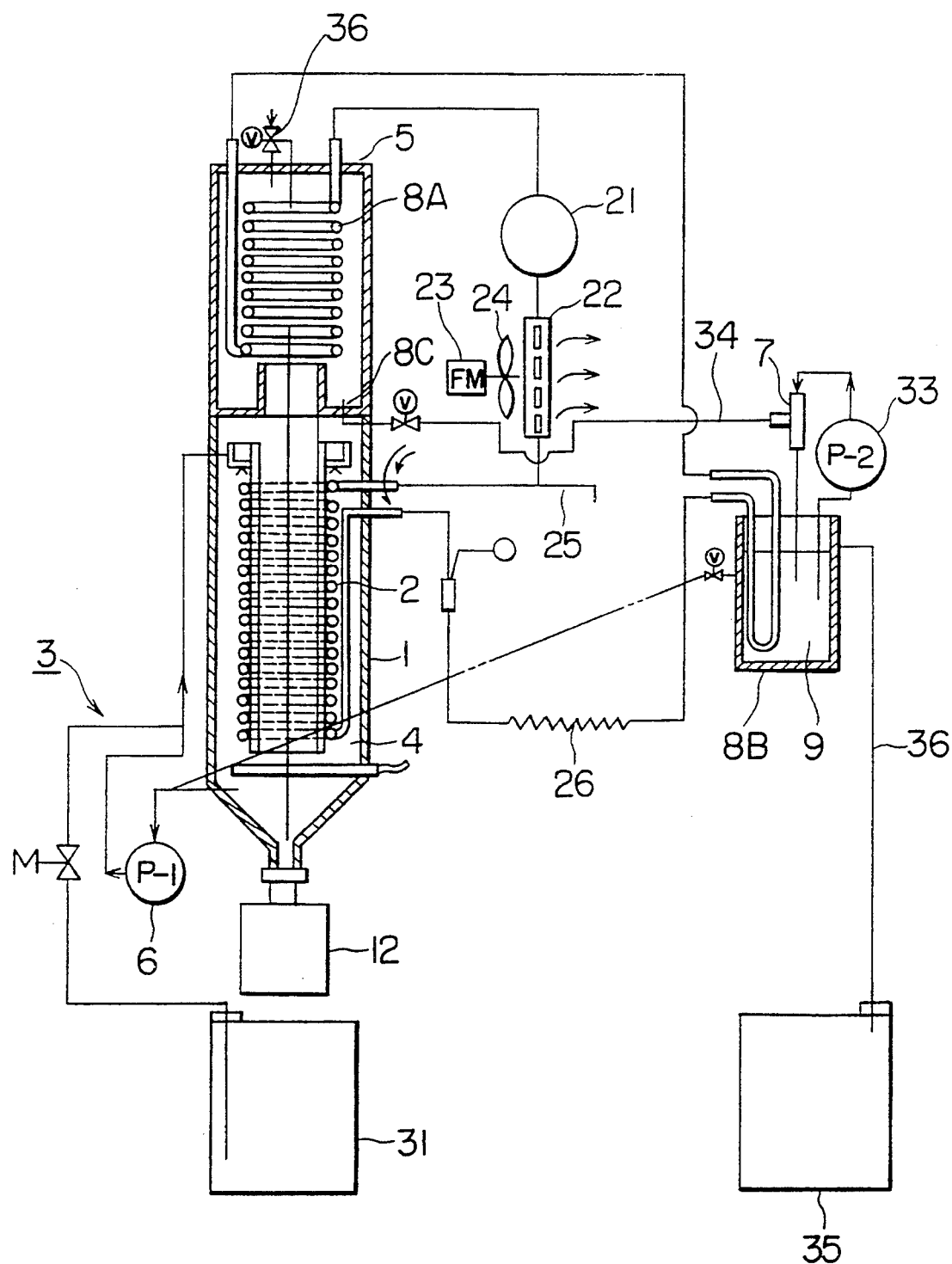
FIG. 1 is a cross sectional representation of a first embodiment of the present invention in order to achieve the first object thereof.

For the purpose of illustration only, the present invention will now be illustrated by the following embodiments. Of course, the present invention shall not be limited to the following embodiments.

In describing the preferred embodiment of the present invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Embodiment 1

In the accompanying drawings, FIG. 1 is a cross sectional representation of a first embodiment of a low pressure evaporation concentrating apparatus for photographic process waste disposal according to the present invention. A low pressure evaporation concentrating column 1 (hereinafter referred to as the "column 1") which can endure a low pressure has photographic process waste liquid injected and reserved therein. The column 1 has an water cooling condenser 5 provided on a top thereof. The water cooling condenser 5 has pressure reducing device (ejector) 7 connected thereto to reduce a pressure therein. It is known that a liquid can be boiled at the lower temperature than its boiling point at a pressure lower than the atmospheric pressure. In the present invention, evaporation is made at a low pressure and at a low temperature at which gas is hard to generate under the standard atmospheric pressure.

Also, the column 1 has a heater 2 therein which is arranged in a three dimensional form. A lower portion of the heater 2 is immersed in a waste liquid of the reservoir 4 in which the photographic process waste liquid is reserved to be heated. An upper portion of the heater 2 is protruded in air higher than the photographicic waste liquid. The photographicic waste liquid is sprayed to this portion in the air from the waste liquid reservoir 4 through a waste liquid supply pipe 3 by a suction pump (P-1) 6. The arrangement described above allows the photographic process waste liquid to be concentrated quickly and efficiently as it is repeatedly heated and evaporated at the low pressure while it is being sprayed.

For the evaporated water are provided to a cooling device 8A having a condensed water guide, and a distilled water reservoir 8C on the upper portion of the column 1. This is preferable to make the arrangement compact and stabilize the pressure reduction in the column 1. The components solidified to a high density by the repeated evaporation and condensation, on the other hand, are received by a waste collecting vessel 12 connected to the lower portion of the column 1 to collect.

The heater 2, as described above, is arranged in the three dimensional form both in the waste liquid and air. The reason is that its lower portion in the photographic process waste liquid serves mainly to preheat the liquid and its upper portion in the air serves to make the contact area between the sprayed and dripping liquid large. This arrangement is effective to make the low temperature evaporation uniform and efficient without gas generation.

Further, the column 1 has a cooling device 8A provided in the upper portion thereof which can catch aqueous vapor rising up and cool and condense it to collect as water droplets. This arrangement is effective to reduce the load applied to the pressure reducing device 7 (an ejector in this first embodiment) which should keep the low pressure in the column 1 at a predetermined value when the load is greatly increased due to a possible imbalance of the pressure. In other words, the cooling device 8A can suppress an increase of the pressure in the column 1 by cooling and condensing the aqueous vapor right when the pressure is increased by the aqueous vapor generated.

This arrangement may be changed as follows. If the heater 2 is made to set the liquid temperature to an optimum value for evaporation at the low pressure, the heater 2 also can control the temperature of the upper portion of the heater 2 in the air. With difference in conduction, the temperature of the upper portion is made substantially higher than that of the liquid. When the liquid is made to contact the upper portion, it may generate offensive gases because of quick heating. It may be desirable that the quantity of the liquid sprayed should be adjusted so that the temperature of the upper portion can be kept lower than a gas generation temperature. Alternately, the heater 2 is divided to two sections for the liquid and air so that the two temperatures can be independently controlled to different optimum temperatures.

The heater 2 and the cooling device 8A may be any of known devices. The present invention uses heat pumps for them. When the aqueous vapor contacts a surface of the cooling device 8A, it is condensed to water drops. The water drops flow on the cooling device 8A and are collected in a water collecting vessel 9. The surface temperature of the cooling device 8A is preferably lower than 100° C., or best preferably between 20° and 60° C.

For the heater 2 is used a radiator portion of the heat pump. For the cooling device 8A and a cooling device 8B provided in the water collecting vessel 9 is used heat absorbing portion of the heat pump.

Outside the column 1 are provided a charger 25 for charging a refrigerant to the heat pump forming the heater 2, a capillary tube 26 arranged behind the heater 2 for serving as expansion valve, a compressor 21 for refrigerant arranged outside the cooling device 8A, an air cooling radiator 22 for condensing the refrigerant, a fan 24 for blowing the air, and a fan motor 23.

The refrigerant in the capillary tube 26 which passed the condenser of the heater 2 is connected to the cooling device 8B in the water collecting vessel 9. It further is extended to the cooling device 8A which is a refrigerant evaporator of the upper water cooling condenser 5 in the column 1. The refrigerant is returned to the compressor 21.

The cooled water in the water collecting vessel 9 is connected to the pressure reducing device 7 through a circulating pump (P-2) 33. The water drawn through a pipe 34 from a distilled water reservoir 8C of the water cooling condenser 5 on the upper portion of the column 1 is made to enter into the water collecting vessel 9. At the same time, the pressure in the column 1 is reduced.

The water which overflows from the water collecting vessel 9 is fed through a pipe 36 to a water tank 35. It then is discharged into the sewer.

The column 1 can have the waste liquid fed from a photographic process waste liquid vessel 31 by the suction pump (P-1) 6. The suction pump (P-1) 6 can be used as a circulation pump for a condensed liquid in the column 1.

In this embodiment, in addition to the cooling device 8A in the condenser 5, another cooling device 8B is provided in the water collecting vessel 9. With this cooling device 8B, vapor mixed in the water droplets collected from the reservoir 8C can be cooled again to be condensed to water drops. Thereby, exhaust gas having offensive smell can be further reduced. Additionally, since the water in the vessel 9 can be cooled by this cooling device 8B, the efficiency of the ejector 7 can be enhanced.

In such a very simple arrangement of heat pump, most of the evaporated vapor can be liquefied, and little quantity of it can be exhausted out of the pipe 36 so that offensive smell can be prevented completely.

Embodiment 2

Figure 2:
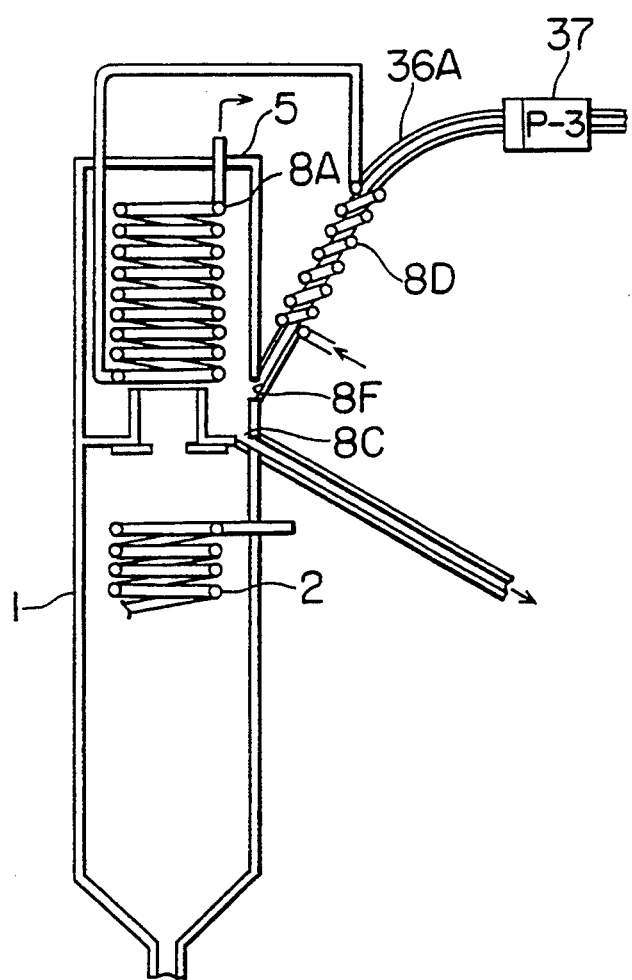
FIG. 2 is a partially cross sectional representation of a second embodiment of the present invention in order to achieve the first object thereof.

In the accompanying drawings, FIG. 2 is a partially cross sectional representation of a second embodiment of a low pressure evaporation concentrating apparatus for photographic process waste disposal according to the present invention. A column 1 has a water cooling condenser part 5 provided at an upper portion thereof. The water cooling condenser part 5 has a cooling device 8A provided therein. The cooling condenser part 5 has an outlet 8F provided at a lower portion thereof. The outlet 8F is connected with an exhaust pipe 36A. The exhaust pipe 36A is connected to an exhaust air pump (P-3) 37 which can exhaust evaporated vapor. The exhaust pipe 36A has a cooling device 8D provided therearound. The cooling device 8D is connected to the cooling device 8A.

Embodiment 3

Figure 3:
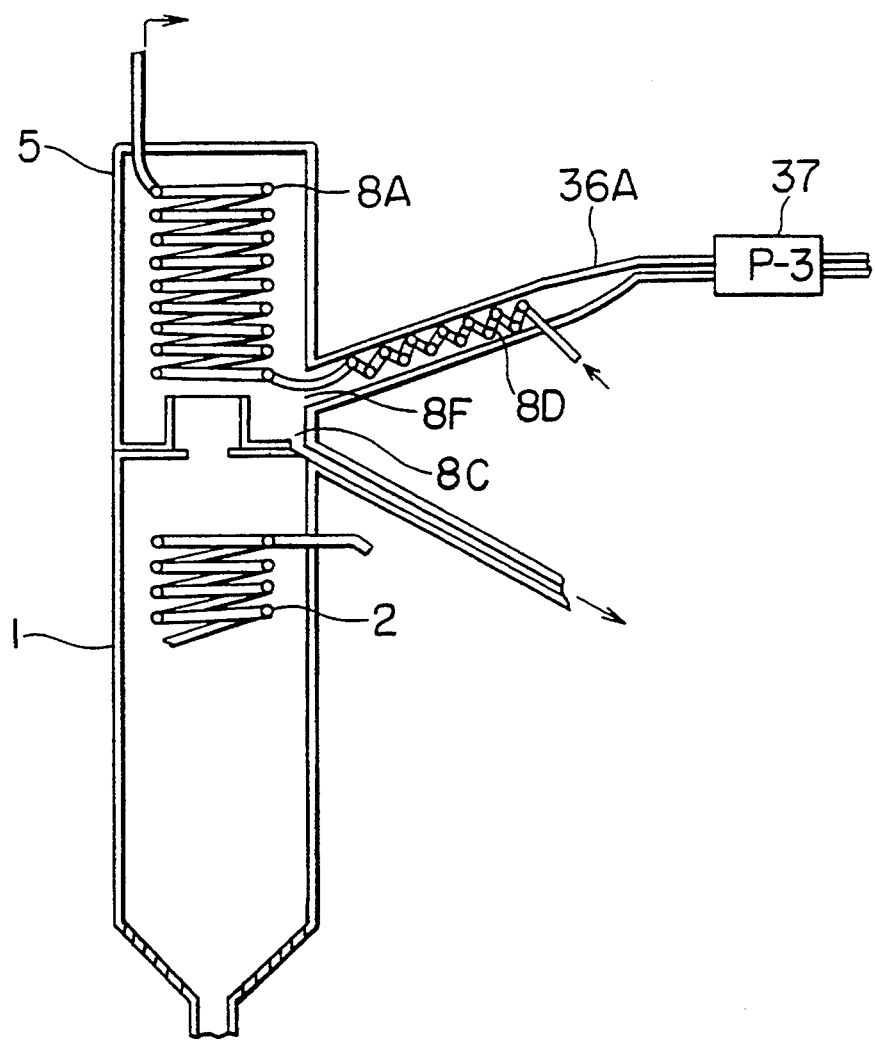
FIG. 3 is a partially cross sectional representation of a third embodiment of the present invention in order to achieve the first object thereof.

In the accompanying drawings, FIG. 3 is a cross sectional representation of a third embodiment of a low pressure evaporation concentrating apparatus for photographic process waste disposal according to the present invention. The cooling device 8D mentioned in embodiment 2 may be provided inside the exhaust pipe 36A as shown. This arrangement allows the pressure reducing section to also serve as vapor exhaust section. It further can condense the exhausted vapor so that little vapor can be exhausted. This means that offensive smell can be completely prevented.

As described above in the preferred embodiments, the low pressure evaporation concentrating apparatus for photographic process waste disposal according to the present invention can increase the quantity of the condensed water collected, and can decrease the quantity of the evaporated vapor exhausted. This results in by far higher prevention of the offensive smell from being generated. The apparatus itself can be made simple, secure, and compact with effective use of the heat pump.

Embodiment 4

Figure 4:
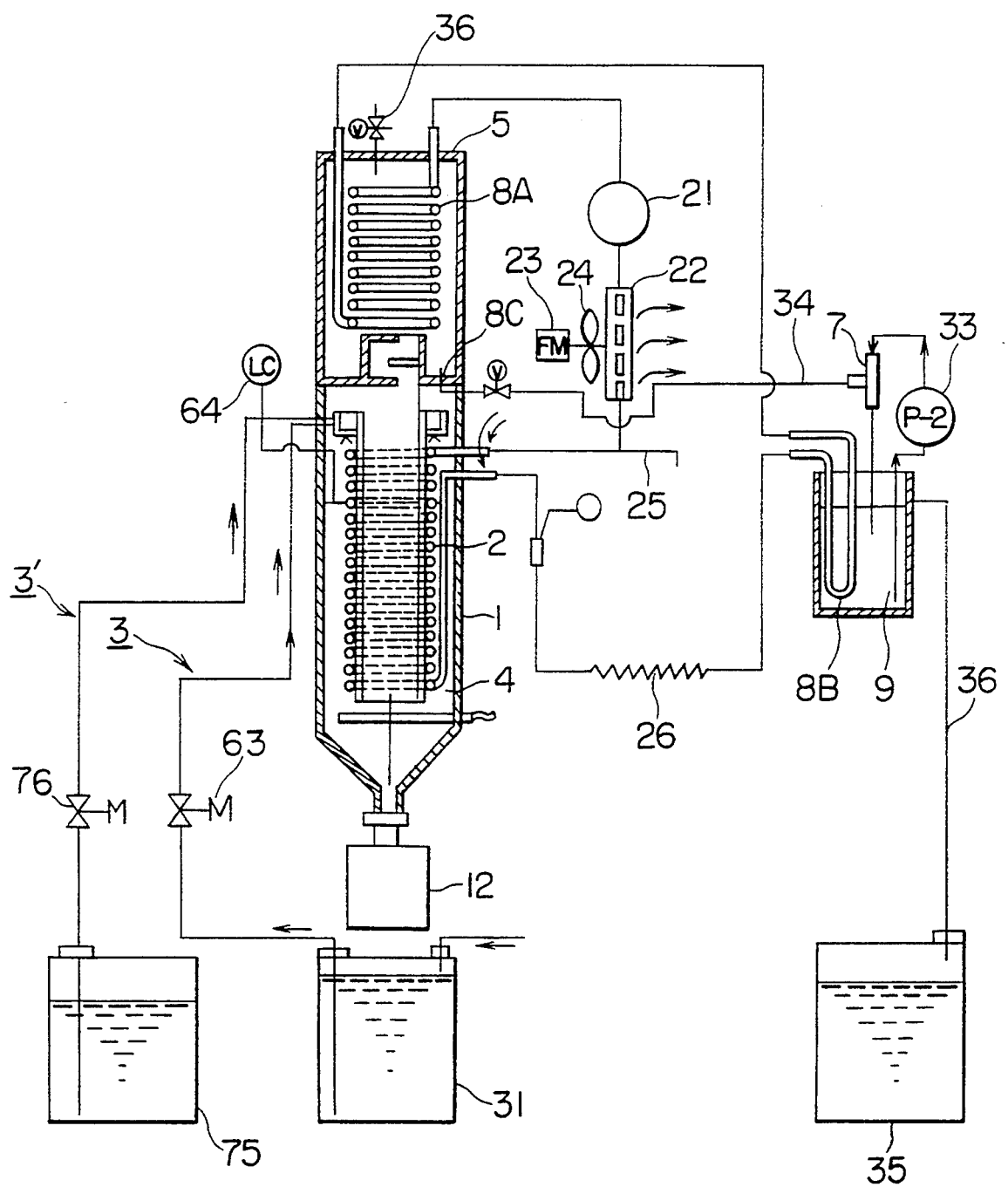
FIG. 4 is a cross sectional representation of a fourth embodiment of the evaporation concentrating apparatus according to the present invention in order to achieve the second object thereof.

In the accompanying drawings, FIG. 4 is a cross sectional representation of a fourth embodiment of a low pressure evaporation concentrating apparatus for photographic process waste disposal according to the present invention. This embodiment is preferable to achieve the second object of the present invention. In the figure are omitted descriptions of the same sections and features as those in FIG. 1. They are referred to with the same symbols.

In the embodiment, the heater 2 has the photographic process waste liquid fed from its upper portion. The waste liquid and a pH adjusting liquid are fed from a photographic process waste liquid vessel 31 and a pH adjusting liquid tank 75 containing a pH adjusting liquid through an electromagnetic valve 63 and an electromagnetic valve 76 to the waste liquid supply pipe 3 and pH adjusting liquid supply pipe 3', respectively. The pH of the waste liquid in the column 1 can be adjusted to 4.5 to 7.5 by them. The arrangement described above allows the photographic process waste liquid to be concentrated quickly and efficiently as it is repeatedly heated and evaporated at low pressure while it is being sprayed.

The column 1 in the embodiment provides virtually same thermal efficiency and concentration rate even with the pressure reducing device (ejector) 7 stopped as with it running. It should be noted however that for the purpose, pumps are needed in place of the electromagnetic valve 63 and the electromagnetic valve 76 to suck up the waste liquid and the pH adjusting liquid from the photographic process waste liquid vessel 31 and the pH adjusting liquid tank 75 to the column 1.

There is provided a level sensor (LC) 64 to inform the supply amount of the waste liquid into the column 1 that should be made in proper time.

Embodiment 5

Figure 5:
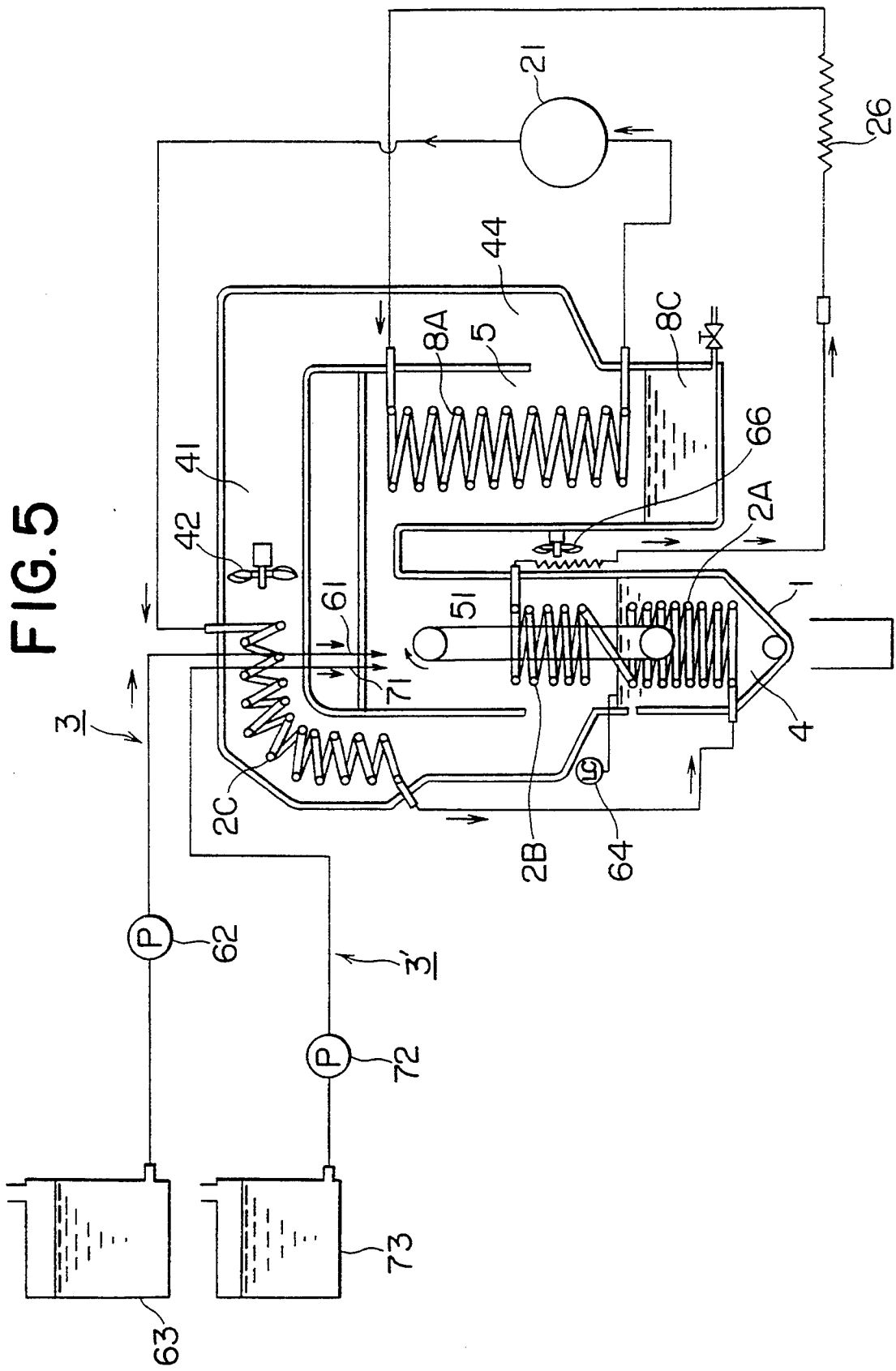
FIG. 5 is a cross sectional representation of a fifth embodiment of the present invention in order to achieve the second object thereof.

In the accompanying drawings, FIG. 5 is a cross sectional representation of a fifth embodiment of a low pressure evaporation concentrating apparatus for photographic process waste disposal according to the present invention. This embodiment is also preferable to achieve the second object of the present invention. In the figure are described the same sections and features as those in FIG. 1 with the same symbols.

A column 1 which can endure a low pressure has a waste liquid reservoir 4, a heating section 2A of its heat pump, and a liquid carry up belt 51 for carrying up the liquid from the waste liquid reservoir 4 provided independently. An upper part of the column 1 is communicated thereto. There are provided a water cooling condenser 5 and a distilled water reservoir 8C for distilled water in the vicinity of the column 1. The water cooling condenser 5 has a cooling portion 8A of the heat pump therein, and has a part on an upper portion thereof which is communicated to an upper part of the column 1. A lower part of the water cooling condenser 5 has an air path 44 provided which is communicated to a high temperature duct 41 which conducts the vapor. The high temperature duct 41 has a heating section 2C of the heat pump and a fan 42. The air containing remaining vapor which is cooled entering from the upper part of the cooling device 8A is circulated through the air path 44 and the high temperature duct 41 to the column 1 by the fan 42. In the circulation, the vapor is heated together with the air by the heating section 2C.

The space above the waste liquid reservoir 4 of the column 1 has a heating section 2B of the heat pump therein which is connected with the heating section 2A.

The waste liquid is evaporated quickly with the aid of parts of the heated vapor and air in the high temperature duct 41 as being carried up by the circulating of liquid carrying belt 51. In such a process, the evaporating concentration efficiency is increasingly raised.

For the heat source and cooling source is used the heat pump. The high pressure heated refrigerant compressed by a compressor 21 is passed through the heating section 2C, heating section 2B, and heating section 2A connected in series, and comes out of the column 1. It then is passed through a capillary tube 26 serving as expansion valve to be vaporized as being cooled by a fan 66. It further is passed through the cooling device 8A, and is returned to the compressor 21.

FIG. 5 has a pressure reducing section omitted therein. It is however preferable to provide it as in FIG. 1 as it can prevent offensive smell from being evaporated. If this is not a problem, the pressure reducing section may be omitted.

In this fifth embodiment, the column 1 can have the photographic process waste liquid and pH adjusting agent fed thereinto from both reservoirs 63 and a 73 through a waste liquid supply pipe 3 and a pH adjusting liquid supply pipe 3' by a pump (P) 62 and a pump (P) 72, and from a supply port 61 and a supply port 71 of the waste liquid supply pipe 3 and the pH adjusting liquid supply pipe 3' fitted on a top of the column 1, respectively, as shown in FIG. 5.

There is provided a level sensor (LC) 64 which indicates when waste liquid should be added to column 1.

As the pH of the photographic process waste liquid and the pH adjusting agent are known beforehand, the quantities of the both liquids to be supplied into the column 1 to obtain a proper pH can be determined according to its value. It is therefore easy to feed the waste liquid of a desired pH into the column 1.

EXPERIMENTS

The following paragraphs describe the result of a few experiments in which the second object of the low pressure evaporation concentrating apparatus for photographic process waste disposal according to the present invention can be achieved.

Experiment 1

Color negative films used in the experiment 1 were the one of the ASA 100 and 400 of Konica Co., Fuji Film Co., and Kodak Co. which are available on the market. These films were processed in the following process steps and process specification.

| Process step | Process time | Process temperature | Q'ty of replenishment |
| --- | --- | --- | --- |
| Color development | 3 min 15 sec | 38° C. | 12 ml |
| Bleaching | 45 sec | 37° C. | 1.5 ml |
| Fixing | 1 min 30 sec | 37° C. | 10 ml |
| Stabilization | 60 sec | 37° C. | 10 ml |
| Drying | 60 sec | 70° C. | — |

NOTE: The quantity of replenishment is a quantity per 100 $cm^2$ of sensitive material.

The fixing tank used was a two-tank counter current (45 sec, two tanks). The stabilizing tank used was a three-tank counter current (20 sec, three tanks).

Composition of process solution used is as follows.

| (1) Color development tank solution | |
| --- | --- |
| Potassium carbonate | 30 g. |
| Sodium bicarbonate | 2.5 g. |
| Potassium sulfite | 4 g. |
| Sodium bromide | 1.3 g. |
| Potassium iodide | 1.2 mg. |

| (1) Color development tank solution | |
|---|---|
| Hydroxylamine sulfate | 2.5 g. |
| Sodium chloride | 0.6 g. |
| 4-amino-3-methyl-N-ethyl-N-(beta-hydroxylethyl) aniline sulfate | 4.8 g. |
| Potassium hydroxide | 1.2 g. |

The solution has water added to one liter, and is adjusted to pH 10.06 with the addition of the potassium hydroxide or 50% sulfuric acid.

| (2) Color development replenishing solution | |
|---|---|
| Potassium carbonate | 40 g. |
| Sodium bicarbonate | 3 g. |
| Potassium sulfite | 7 g. |
| Sodium bromide | 0.5 g. |
| Hydroxylamine sulfate | 3.1 g. |
| 4-amino-3-methyl-N-ethyl-N-(beta-hydroxylethyl) aniline sulfate | 6.0 g. |
| Potassium hydroxide | 2 g. |

The solution has water added to one liter, and is adjusted to pH 10.12 with the addition of the potassium hydroxide or 20% sulfuric acid.

| (3) Bleaching tank solution | |
|---|---|
| 1-3-propylene diamine ferric acetate ammonium | 150 g. |
| Acetic acid (90% aqueous solution) | 50 ml |
| Ammonium bromide | 150 g. |

The solution has water added to one liter, and is adjusted to pH 4.4 with use of ammonia water or glacial acetic acid.

(4) Bleaching replenishing solution

The bleaching replenishing solution used was the bleaching tank solution which was adjusted to pH 4.2 with use of acetic acid.

| (5) Fixing tank solution and replenisher | |
|---|---|
| Ammonium thiosulfate | 250 g. |
| Ammonium sulfite | 20 g. |
| Example [A'-7] (ammonium salt) | 2 g. |

The solution has water added to one liter, and is adjusted to pH 6.8 with use of the acetic acid and ammonium water.

| (6) Stabilizing tank solution and replenishing solution | |
|---|---|
| Formaldehyde (37% solution) | 1 ml |
| 5-chloro-2-methyl-4-isothiazoline-3-on | 0.05 g |
| EMULGEN 810 | 1 ml |
| Formaldehyde with sodium bisulfite | 2 g. |

The solution has water added to one liter, and is adjusted to pH 7.0 with use of ammonium water and 50% sulfuric acid.

Color paper was processed in the following process steps and process solutions.

| Process step | Process temperature | Process time | Q'ty of replenishment | Number of tank |
|---|---|---|---|---|
| (1) Color development | 38° C. | 30 sec | 200 ml/m$^2$ | One |
| (2) Bleaching and fixing | 33° C. | 25 sec | 100 ml/m$^2$ | One |
| (3) Stabilization | 33° C. | 30 sec | 500 ml/m$^2$ | Three |

NOTE: The three-tank method is made in a counter current method.

Composition of process solution used is as follows.

| (1) Color development tank solution | |
|---|---|
| Triethanole amine | 10 ml |
| Potassium sulfite | 0.2 g. |
| Sodium chloride | 1.5 g. |
| Potassium carbonate | 32.0 g. |
| 3-methyl-4-amino-N-ethyl-N-(beta-methane sulfo amid etyl) aniline sulfate | 5.5 g. |
| Luminescent whitening dye (diaminosthylben group) | 1.0 g. |
| Diethylhydroxilamine | 5.0 g. |
| Diethylene triamine penta acetic acid | 3.0 g. |
| Potassium bromide | 2 mg. |
| 1.2-dihydroxibenzene-3.5-disulfonic acid-sodium salt | 0.2 g. |

The solution has water added to one liter, and is adjusted to pH 10.15 with use of the potassium hydroxide and sulfuric acid.

(2) Color development replenishing solution The quantity of the 3-methyl-4-amino-N-ethyl-N-(beta-methane sulno amid ethyl) aniline sulfoamide in the color development tank solution was adjusted to 7.0 g/l, and the quantity of the potassium bromide is 0, and the pH is adjusted to 10.60.

| (3) Bleaching and fixing tank solution and replenishing solution | |
|---|---|
| Ethylene diamintetra ferric acetic acid ammonium 2 water salt | 60 g. |
| Ethylene diamintetra ferric acetic acid | 3 g. |
| Ammonium thiosulfate (70% solution) | 140 ml |
| Ammonium sulfite (40% solution) | 27.5 ml |

The solution has water added to one liter, and is adjusted to pH 5.8 with use of potassium carbonate and/or glacial acetic acid.

| (4) Stabilizing tank solution and replenishing solution | |
|---|---|
| 1-hydroxiethyleden-1,1-difosufonic acid | 2 g. |
| BiCl$_3$ | 0.3 g. |
| ZnSO$_4$-7H$_2$O | 0.7 g. |
| Fluorescent whitening dye (diaminosthylben group) | 1.0 g. |
| Caison WT (of Loam and Hearse Co.) | 0.5 g. |

The waste liquids obtained through the processes for negative film and photographic print paper were all mixed and pH adjusted. The mixed liquid, as will be described later, was concentrated in the waste liquid process apparatus shown in FIG. 4, and the waste liquid process rate at the time was measured. In the measurement, the reducing waste liquid was measured every 30 minutes, and the measured values for two hours were averaged. The results are shown in Table 1.

TABLE 1

| | pH | Waste liquid process rate l/hr |
|---|---|---|
| No adjustment (As all were mixed) | 8.5 | 1.7 |

TABLE 1-continued

| | pH | Waste liquid process rate l/hr |
|---|---|---|
| The pH was adjusted as varied widely with sodium bisulfate added as pH adjusting agent. | 8.0 | 1.75 |
| | 7.5 | 2.1 |
| | 7.0 | 2.3 |
| | 6.2 | 2.5 |
| | 5.6 | 2.5 |
| | 5.2 | 2.5 |
| | 5.0 | 2.3 |
| | 4.5 | 2.1 |
| | 4.0 | 1.7 |

Experiment 2

In turn, as experiment 2, the pH of the process waste liquid obtained with use of the following sensitizing materials and process steps was widely changed, and the process waste liquid was concentrated with use of the same evaporation concentrating apparatus as in experiment 1, and the concentration rate was measured.

(1) Sensitizing materials

The Konica RST clear light contact film CRHE of Konica Co. had have been exposed normally and processed in the following process solutions and process steps.

| (2) Developing solution prescription | |
|---|---|
| Hydroquinone | 25 g. |
| 1-phenyl-4,4 dimethyl-3-pirazoridon | 0.4 g. |
| Sodium bromide | 3 g. |
| 5-methylbenzotriazole | 0.3 g. |
| 5-nitroindazole | 0.05 g. |
| Diethylaminopropane-1,2-diole | 10 g. |
| Potassium sulfite | 90 g. |
| Potassium carbonate | 30 g. |
| Hydroxyethylenediamin sodium triacetate | 2 g. |

The solution has water added to one liter, and is adjusted to pH 10.2 with use of caustic soda.

| (3) Fixing solution prescription | |
|---|---|
| a. Chemical composition A | |
| Ammonium thiosulfate (72.5 w % aqueous solution) | 240 ml |
| Sodium sulfite | 17 g. |
| Sodium acetate salt with 3 crystal water | 6.5 g. |
| Boric acid | 6 g. |
| Sodium citrate salt with 2 crystal water | 2 g. |
| Acetic acid (90 w % aqueous solution) | 13.6 ml |
| b. Chemical composition B | |
| Pure water (ion exchanged water) | 17 ml |
| Sulfuric acid (50 w % aqueous solution) | 3.0 g. |
| Aluminum sulfate (8.1 w % aqueous solution as $Al_2O_3$ converted) | 20 g. |

At the use of the fixing solution, the chemical compositions A and B mentioned above were dissolved in water of 500 ml to one liter in the sequence. The pH of the fixing solution was around 4.2.

| (4) Developing process conditions | | | |
|---|---|---|---|
| Step | Temperature | Time | Replenishment |
| Development | 40° C. | 15 sec | 30 ml per ¼ size |
| Fixing | 35° C. | 15 sec | 40 ml per ¼ size |
| Water washing | Room temp | 15 sec | Running water |

With use of the the developing waste liquid and the fixing waste liquid discharged on the process conditions mentioned above, the pH of the fixing waste liquid was adjusted. The pH adjusting agent used was a 10% aqueous solution of sodium hydroxide and the developing waste liquid mentioned above. The evaporation concentrating apparatus used was same as in experiment 1. The results obtained are shown in Table 2. The evaporation concentrating rate was obtained in terms of a reduced amount of the waste liquid in operation for one hour.

TABLE 2

| pH adjusting agent | pH | Waste liquid process rate l/hr | |
|---|---|---|---|
| No adjustment | 4.3 | 1.7 | Comparison |
| Adjustment with sodium hydroxide | 6.2 | 2.5 | Invention |
| | 8.5 | 1.5 | Comparison |
| pH adjustment with developing waste water | 6.2 | 2.5 | Invention |
| | 8.5 | 1.5 | Comparison |

For the pH adjusting agent, acids and/or alkali agents can be used. As the acid pH adjusting agent, if an aqueous solution is acid, it can be used to decrease the pH of the waste liquid. The acids, for example, include inorganic acids, such as sulfuric acid, hydrochloric acid, nitric acid, boric acid, carbonic acid, and sulfamine acid; carboxylic acids, such as acetic acid, oxalic acid, citric acid, malonic acid, and tartaric acid; aminopolycarboxylic acids, such as ethylenediamin 4 acetic acid and nitorilo 3 acetic acid; organic phosphonic acid; and acid salts, such as sodium bisulfate.

On the other hand, as the alkaline pH adjusting agent can be used an aqueous solution that is alkaline to increase the pH of the waste liquid. The alkali, for example, include alkali metals and/or hydroxides of alkaline earth metals, such as NaOH, KOH, LiOH, $Ca(OH)_2$, $Mg(OH)_2$; ammonium hydroxide; alkali metallic salts of inorganic weak acid, such as carbonate, silicate, phosphate, borate; and alkali metallic salts of organic acid, such as acetic soda, citric soda, organic carbonate, and organic phosphonate.

The fixing solution for X-ray films and sensitive materials for Lithography has low pH and the pH adjusting agent needed for the pH range in the present invention is alkaline. So the developing waste liquid is desirable as the pH adjusting agent which is not needed to be specifically prepared.

From the results of experiments 1 and 2, it is preferable that the pH of the photographic process waste liquid to be supplied for evaporation concentration should be 4.5 to 7.5, more preferable that it should be 5.0 to 7.0, and best preferable that it should be 5.2 to 6.2.

Adjustment of the pH of the process waste liquid to 4.5 to 7.5 may be made with the pH adjusting agent before the waste liquid is supplied into the evaporation concentrating column, or alternately may be made in the column with an additional system for supplying the pH adjusting agent independently of the system for supplying the waste liquid into the column.

As described so far, in the evaporation concentration of the photographic process waste liquid, the method and apparatus of the present invention where the pH adjusting agent is added to get the pH 4.5 to 7.5 in the waste liquid could considerably increase the evaporation concentrating rate. The energy efficiency, therefore, could be increased considerably with the heating section and the cooling section of the heat pump used for the heating source for evaporation concentration and the cooling source for vapor condensation.

While the principles of the present invention have been described above in connection with specific embodiments, and particular modifications thereof, it is to be clearly understood that this description is made only by way of example and not as a limitation on the scope of invention. For example, in the embodiment to achieve the first object, another cooling device 8B for cooling the condensation can be provided in the condenser 5 or in the collecting line between the condenser 5 and the ejector 7.

What is claimed is:

1. An apparatus for concentration of waste liquid comprising:

an evaporator including an evaporation chamber and a heater, wherein said evaporator, by said heater, evaporates at least a part of said waste liquid in said evaporation chamber to concentrate said waste liquid;

a condenser including a condensation chamber, a reservoir, and a first cooler, wherein said condensation chamber is in communication with said evaporation chamber to receive an evaporated gas, said first cooler condensing at least a part of said evaporated gas to form a first condensed liquid, said reservoir storing said first liquid;

a pressure reducer including an ejector, in communication with said condensation chamber, to reduce pressure on said condensation chamber by taking said evaporated gas and said first liquid out of said condensation chamber;

a liquid collector having a second cooler, wherein said liquid collector receives said gas and said first liquid from said reservoir and said second cooler cools said gas and said first liquid whereby substantially all said gas present with said first liquid is condensed to a second condensed liquid;

a pump for circulating said second liquid out of said liquid collector, through said ejector and back to said liquid collector, said ejector removing said first liquid and said evaporated gas from said condensation chamber by suction generated by said second liquid and ejecting said first liquid, said evaporated gas, and said second liquid to said liquid collector; and a heat pump circuit having a looped sequence of a compressor, a heat radiating portion, an expander, and a heat absorbing portion, and a heat transfer fluid circulating in said heat pump circuit, wherein said heat radiating portion is a heat source for said heater and said heat absorbing portion is a cooling source for said first cooler and said second cooler.

2. The apparatus of claim 1 wherein said ejector is an aspirator.

3. The apparatus of claim 1 further comprising a source of pH adjusting liquid connected to said evaporation chamber.

4. The apparatus of claim 1 further comprising a recycle gas outlet extending from said condensing chamber to said evaporation chamber whereby recycle gas assists in evaporation of said waste liquid.

5. The apparatus of claim 4 wherein there is a second heater in said recycle outlet.

6. The apparatus of claim 5 wherein said heat transfer fluid passes through said second heater between said compressor and said expander.

7. The apparatus of claim 1 wherein said heat transfer fluid circulates through said second cooler between said expander and said compressor.

* * * * *